US008436848B2

(12) United States Patent
Hsu et al.

(10) Patent No.: US 8,436,848 B2
(45) Date of Patent: May 7, 2013

(54) GATE OUTPUT CONTROL METHOD

(75) Inventors: Chao-Ching Hsu, Hsin-Chu (TW); Yi-Fan Lin, Hsin-Chu (TW); Kuan-Ming Lin, Hsin-Chu (TW); Shih-Yuan Su, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 391 days.

(21) Appl. No.: 12/684,910

(22) Filed: Jan. 9, 2010

(65) Prior Publication Data

US 2011/0169816 A1 Jul. 14, 2011

(30) Foreign Application Priority Data

Jun. 19, 2009 (TW) ............................... 98120742 A

(51) Int. Cl.
*G06F 3/038* (2006.01)

(52) U.S. Cl.
USPC ............... 345/213; 345/211; 345/30; 345/50; 345/55; 345/99

(58) Field of Classification Search .......... 345/211–213, 345/30, 50, 55, 99
See application file for complete search history.

(56) References Cited

U.S. PATENT DOCUMENTS

| | | | | |
|---|---|---|---|---|
| 6,359,607 | B1 * | 3/2002 | Yanagi et al. | 345/94 |
| 2001/0033266 | A1 * | 10/2001 | Lee | 345/94 |
| 2005/0088391 | A1 * | 4/2005 | Kim | 345/94 |
| 2009/0189883 | A1 | 7/2009 | Chung et al. | |

FOREIGN PATENT DOCUMENTS

CN 101315749 A 12/2008

* cited by examiner

*Primary Examiner* — Christopher E Leiby
(74) *Attorney, Agent, or Firm* — WPAT, PC; Justin King

(57) ABSTRACT

An exemplary gate output control method includes the following steps: providing a gate control signal; using an angling control signal to angling modulate the gate control signal so as to generate a modulated gate control signal; and supplying the modulated gate control signal to a first integrated gate driver circuit and a second integrated gate driver circuit, to sequentially control the gate outputs of the first integrated gate driver circuit and the second integrated gate driver circuit. A duty ratio used by the angling control signal at the time of modulating the gate control signal to generate the modulated gate control signal for the first integrated gate driver circuit is different from another duty ratio used by the angling control signal at the time of modulating the gate control signal to generate the modulated gate control signal for the second integrated gate driver circuit.

12 Claims, 7 Drawing Sheets

GATE OUTPUT CONTROL METHOD

CROSS-REFERENCE TO RELATED APPLICATIONS

This application is based upon and claims the benefit of priority from the prior Taiwanese Patent Application No. 098120742, filed Jun. 19, 2009, the entire contents of which are incorporated herein by reference.

BACKGROUND

1. Technical Field

The present invention generally relates to display technology fields and, particularly to a gate output control method.

2. Description of the Related Art

Liquid crystal displays (LCD) have the advantages of high image quality, small size, light weight and a broad application range, and thus are widely applied on consumer electronic products such as mobile phones, notebook computers, desktop displays and televisions, and have gradually replaced the traditional cathode ray tube (CRT) displays as the main trend in the display industry.

Referring to FIG. 1, a structural block diagram of a liquid crystal display associated with the prior art is shown. As illustrated in FIG. 1, the liquid crystal display 100 includes a display substrate 110, a printed circuit board 120 and multiple flexible circuit boards 130. The display substrate 110 has multiple integrated gate driver circuits GD1, GD2 and multiple integrated source driver circuits (not shown in FIG. 1) disposed thereon. The display substrate 110 further has multiple display blocks 111, 112 defined thereon. The integrated gate driver circuits GD1, GD2 respectively control the display blocks 111, 112 and are electrically coupled with each other in series through wire-on-array (WOA) lines. The printed circuit board 120 is electrically coupled with the display substrate 110 through the flexible circuit boards 130 and has a timing controller 121 and a gate pulse modulator 123 disposed thereon. The timing controller 121 is for supplying a gate output enable signal YOE to the integrated gate driver circuits GD1, GD2 and outputting a gate control signal VGH (i.e., generally gate on voltage) and an angling control signal YV1C to the gate pulse modulator 123. The provision of the gate pulse modulator 123 is for reducing the image flicker phenomenon of the liquid crystal display.

Referring to FIG. 2 and FIG. 1 together, FIG. 2 showing a circuit block diagram of the gate pulse modulator 123. As illustrated in FIG. 2, the gate pulse modulator 123 primarily includes an inverter, a level shifter and transistors P1, N1. The angling control signal YV1C is processed by the inverter and the level shifter and thereafter controls the on/off states of the transistors P1, N1 to angling modulate the gate control signal VGH, a modulated gate control signal VGG is produced as a result. The modulated gate control signal VGG is sequentially transmitted to the integrated gate driver circuits GD1, GD2 through the flexible circuit boards 130 and the WOA lines, so as to control gate outputs of the integrated gate driver circuits GD1, GD2.

Referring to FIG. 3 and FIG. 1 together, FIG. 3 showing timing diagrams of the gate output enable signal YOE, the angling control signal YV1C and the modulated gate control signal VGG associated with the prior art. As seen from FIG. 3, portions of the angling control signal YV1C and the modulated gate control signal VGG which are corresponding to the integrated gate driver circuit GD1 have identical waveforms with other portions of the angling control YV1C and the modulated gate control signal VGG which are corresponding to the integrated gate driver circuit GD2, an angled voltage of the modulated gate control signal VGG maintains at V1. A high-level cycle of the angling control signal YV1C is T1, a low-level cycle of the angling control signal YV1C is T2, and a duty ratio of the angling control signal YV1C is T1/T2.

Referring to FIG. 4 and FIG. 1 together, since the impedance of the WOA lines is relatively large, which causes waveforms of the modulated gate control signal VGG during being transmitted to the integrated gate driver circuits GD1, GD2 to be varied from wire attenuation, so that a voltage difference ΔV0 exists between a modulated gate control signal VGG1 arrived at the integrated gate driver circuit GD1 and another modulated gate control signal VGG2 arrived at the integrated gate driver circuit GD2. As a result, the display blocks 111, 112 would have different brightness and whereby an H-line occurs, i.e., the drawback of uneven vertical brightness is existed.

BRIEF SUMMARY

The present invention is directed to a gate output control method, so as to effectively overcome the drawback of uneven vertical brightness with respect to a liquid crystal display associated with the prior art.

In order to achieve the above-mentioned objective, or to achieve other objectives, a gate output control method in accordance with an embodiment of the present invention is provided. The gate output control method is adapted to a liquid crystal display including a first integrated gate driver circuit and a second integrated gate driver circuit. The gate output control method includes the following steps: providing a gate control signal; using an angling control signal to angling module the gate control signal and thereby a modulated gate control signal is generated; and supplying the modulated gate control signal to the first integrated gate driver circuit and the second integrated gate driver circuit, to sequentially control gate outputs of the first integrated gate driver circuit and the second integrated gate driver circuit. A first duty ratio used by the angling control signal at the time of the angling control signal modulating the gate control signal to generate the modulated gate control signal for the first integrated gate driver circuit is different from a second duty ratio used by the angling control signal at the time of the angling control signal modulating the gate control signal to generate the modulated gate control signal for the second integrated gate driver circuit.

In one embodiment, when a transmission path length of the modulated gate control signal transmitted to the first integrated gate driver circuit is shorter than another transmission path length of the modulated gate control signal transmitted to the second integrated gate driver circuit, the first duty ratio is larger than the second duty ratio.

In one embodiment, a first low-level cycle and a second low-level cycle respectively corresponding to the first duty ratio and the second duty ratio of the angling control signal are different from each other. Moreover, when a transmission path length of the modulated gate control signal transmitted to the first integrated gate driver circuit is shorter than another transmission path length of the modulated gate control signal transmitted to the second integrated gate driver circuit, the first low-level cycle is smaller than the second low-level cycle.

In one embodiment, the first integrated gate driver circuit and the second integrated gate driver circuit are electrically coupled with each other in series.

In an alternative embodiment, the first integrated gate driver circuit and the second integrated gate driver circuit are electrically coupled with each other in parallel.

In order to achieve the above-mentioned objective, or to achieve other objectives, another gate output control method in accordance with an embodiment of the present invention is provided. The gate output control method is adapted to a liquid crystal display including a first integrated gate driver circuit and a second integrated gate driver circuit. The gate output control method includes the following steps: providing a gate control signal; using an angling control signal to angling modulate the gate control signal so as to angle the gate control signal to a predetermined angled voltage and thereby a modulated gate control signal is generated; and supplying the modulated gate control signal to the first integrated gate driver circuit and the second integrated gate driver circuit, to sequentially control gate outputs of the first integrated gate driver circuit and the second integrated gate driver circuit. The predetermined angled voltage of the modulated gate control signal for controlling the gate output of the first integrated gate driver circuit is different from the predetermined angled voltage of the modulated gate control signal for controlling the gate output of the second integrated gate driver circuit.

In one embodiment, when a transmission path length of the modulated gate control signal transmitted to the first integrated gate driver circuit is shorter than another transmission path length of the modulated gate control signal transmitted to the second integrated gate driver circuit, the predetermined angled voltage of the modulated gate control signal for controlling the gate output of the first integrated gate driver circuit is higher than the predetermined angled voltage of the modulated gate control signal for controlling the gate output of the second integrated gate driver circuit.

In one embodiment, the predetermined angled voltage is varied with the change of a duty ratio of the angling control signal. Moreover, when a transmission path length of the modulated gate control signal transmitted to the first integrated gate driver circuit is shorter than another transmission path length of the modulated gate control signal transmitted to the second integrated gate driver circuit, a first duty ratio used by the angling control signal at the time of the angling control signal modulating the gate control signal to generate the modulated gate control signal for controlling the gate output of the first integrated gate driver circuit is larger than a second duty ratio used by the angling control signal at the time of the angling control signal modulating the gate control signal to generate the modulated gate control signal for controlling the gate output of the second integrated gate driver circuit.

In one embodiment, the predetermined angled voltage is varied with the change of a low-level cycle of the angling control signal. Moreover, when a transmission path length of the modulated gate control signal transmitted to the first integrated gate driver circuit is shorter than another transmission path length of the modulated gate control signal transmitted to the second integrated gate driver circuit, a first low-level cycle used by the angling control signal at the time of the angling control signal modulating the gate control signal to generate the modulated gate control signal for controlling the gate output of the first integrated gate driver circuit is smaller than a second low-level cycle used by the angling control signal at the time of the angling control signal modulating the gate control signal to generate the modulated gate control signal for controlling the gate output of the second integrated gate driver circuit.

In order to achieve the above-mentioned objective, or to achieve other objectives, still another gate output control method in accordance with an embodiment of the present invention is provided. The gate output control method is adapted to a liquid crystal display including multiple integrated gate driver circuits. The gate output control method includes the following steps: providing a gate control signal; providing multiple angling control signals in a non-synchronous manner to angling modulate the gate control signal and thereby multiple modulated gate control signals having different angled voltages are sequentially produced; and supplying the modulated gate control signals to the integrated gate driver circuits to respectively control gate outputs of the integrated gate driver circuits. The angling control signals have different low-level cycles from one another.

In one embodiment, the angling control signals have the same transmission path.

In one embodiment, the integrated gate driver circuits are electrically coupled with one another in series or in parallel.

In the above-mentioned embodiments of the present invention, by adjusting the duty ratio or the low-level cycle of the angling control signal, different segments of the modulated gate control signal for controlling different integrated gate driver circuits would have different angled voltages and could compensate the wire attenuation of the modulated gate control signal during being transmitted to the integrated gate driver circuits. As a result, the segments of the modulated gate control signals arrived at the respective integrated gate driver circuits have no voltage difference from one another and thus the drawback of uneven vertical brightness associated with the prior art can be effectively overcome.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
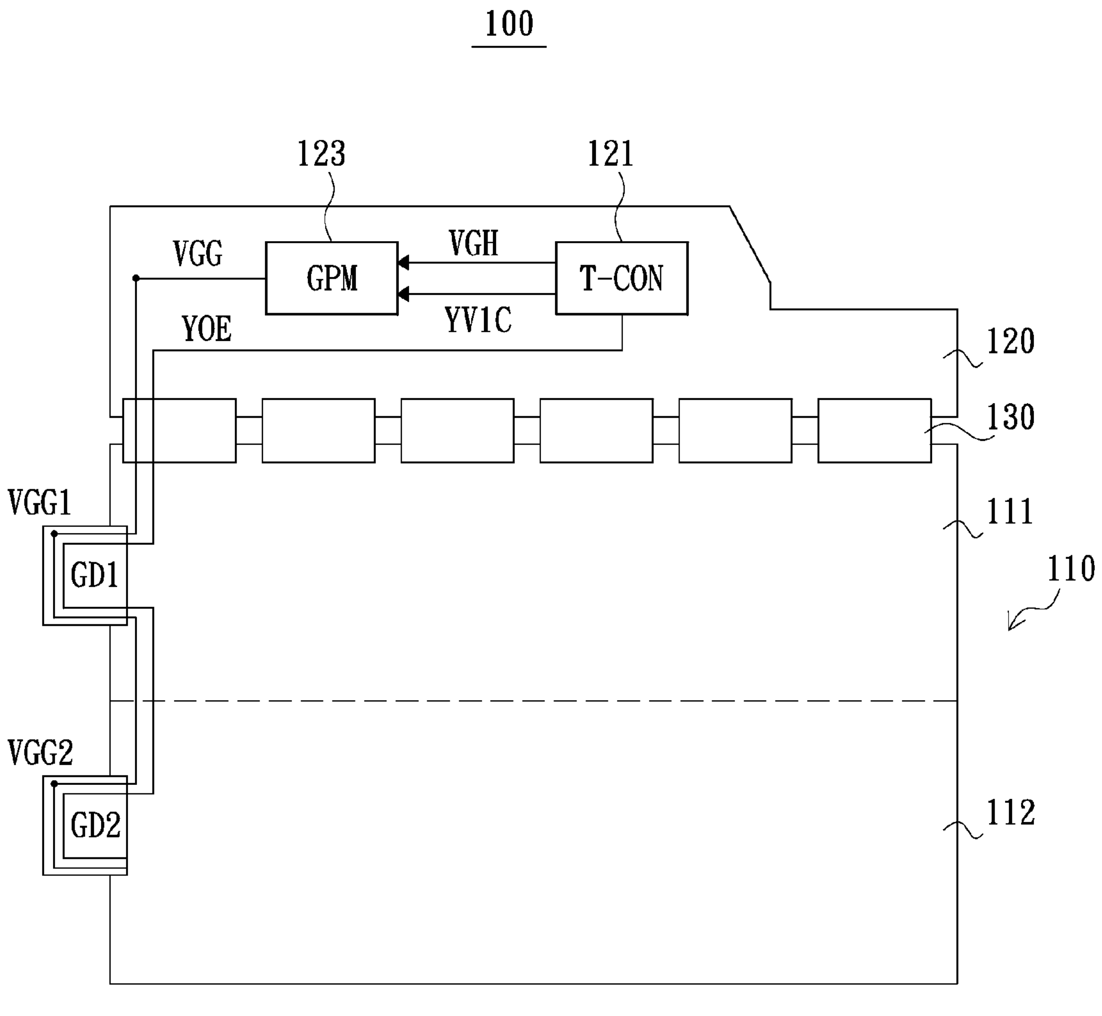
FIG. 1 (Prior Art)
FIG. 1 shows a structural block diagram of a liquid crystal display associated with the prior art.

A gate output control method in accordance with an embodiment of the present invention will be described below in detail with reference to FIGS. 1, 5 and 6. The gate output control method is adapted to the liquid crystal display 100 including series-coupled integrated gate driver circuits GD1, GD2 as illustrated in FIG. 1. The structural configuration of the liquid crystal display 100 can refer to the above-mentioned description and thus will not be repeated herein.

Figure 2:
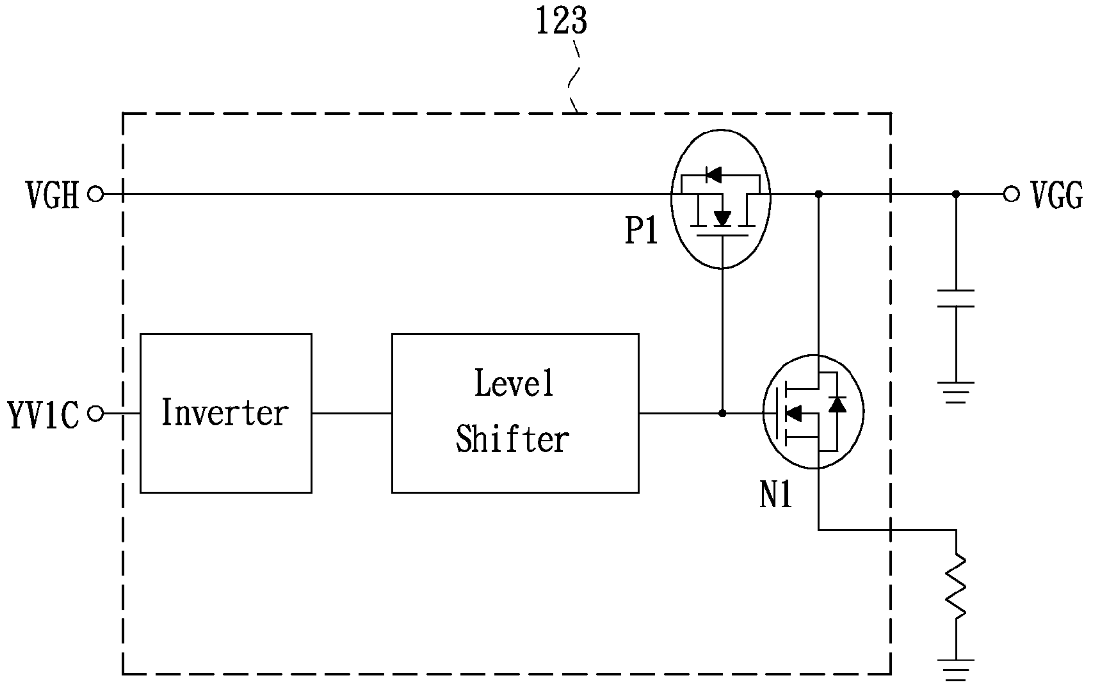
FIG. 2 (Prior Art)
FIG. 2 shows a circuit block diagram of a gate pulse modulator of the liquid crystal display in FIG. 1.
Figure 3:
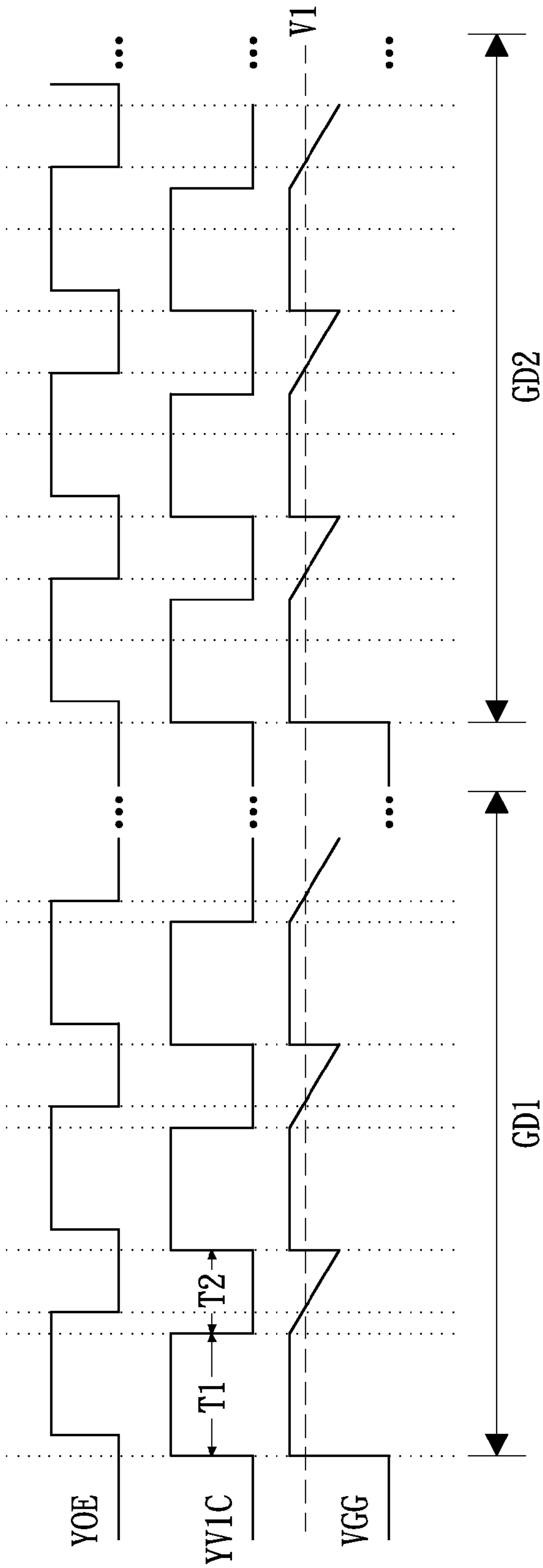
FIG. 3 (Prior Art)
FIG. 3 shows timing diagrams of a gate output enable signal, an angling control signal and a modulated gate control signal of the liquid crystal display in FIG. 1.
Figure 4:
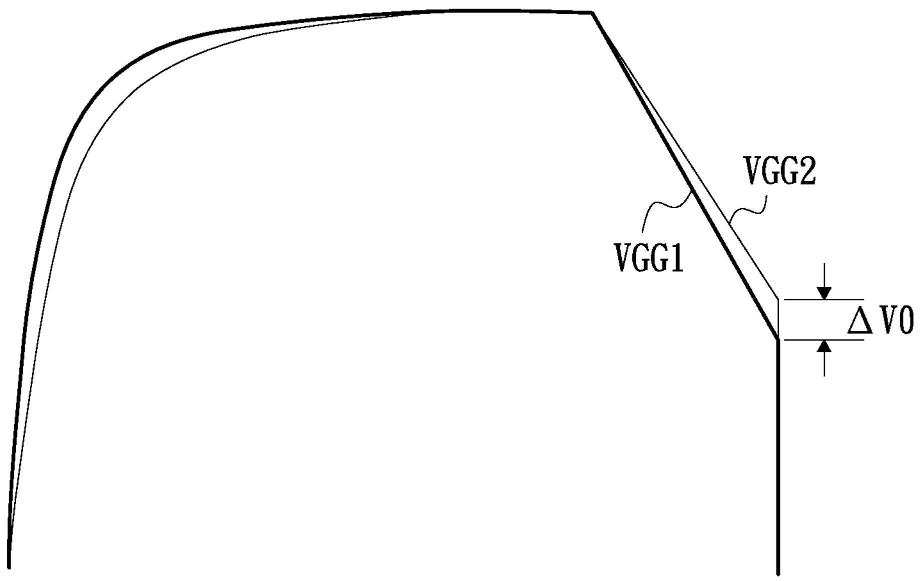
FIG. 4 (Prior Art)
FIG. 4 is a comparison graph of waveforms of the modulated gate control signals arrived at the respective integrated gate driver circuits of the liquid crystal display in FIG. 1.
Figure 5:
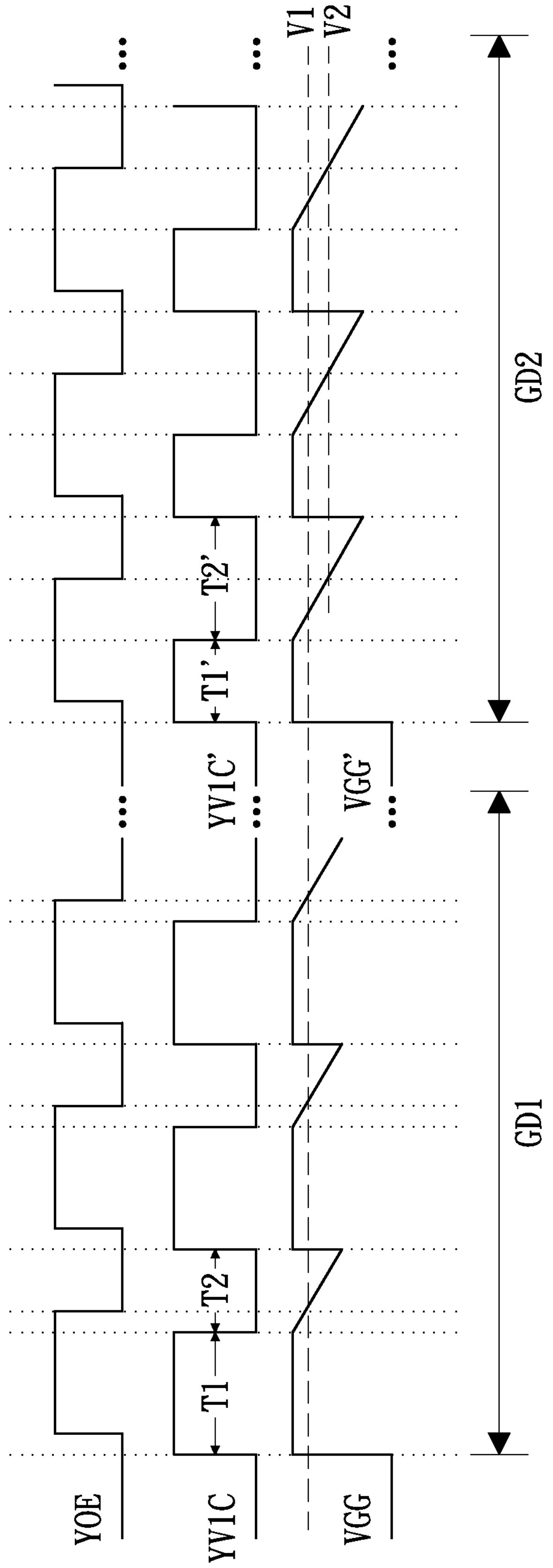
FIG. 5 shows timing diagrams of a gate output enable signal, an angling control signal and a modulated gate control signal, in accordance with an embodiment of the present invention.
Figure 6:
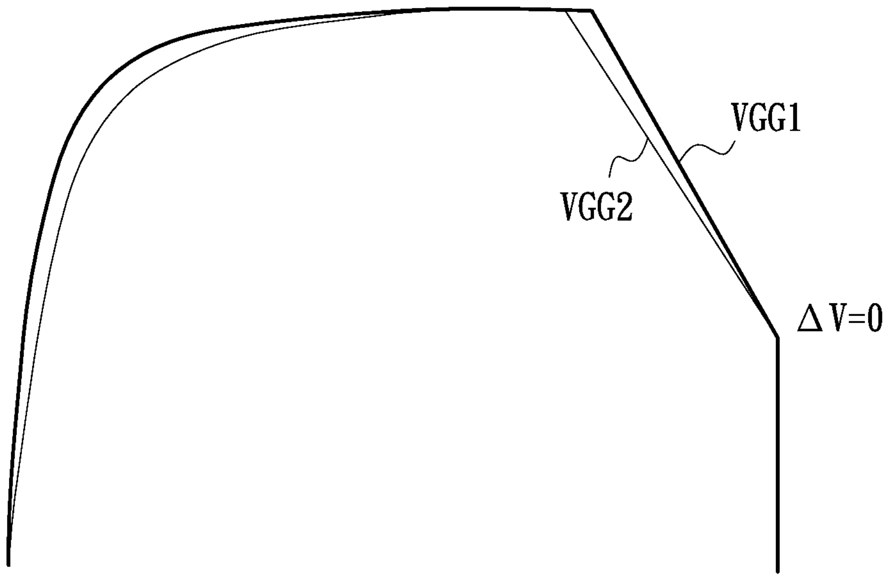
FIG. 6 is a comparison graph of waveforms of the modulated gate control signals arrived at the respective integrated gate driver circuits, in accordance with the embodiment of the present invention.

Referring to FIG. 1 and FIG. 5 together, FIG. 5 showing timing diagrams of a gate output enable signal YOE, an angling control signal YV1C and a modulated gate control signal VGG, in accordance with the present embodiment. Compared FIG. 5 with FIG. 2, it is found that, in one aspect, a duty ratio used by the angling control signal YV1C at the time of modulating the gate control signal VGH (as denoted in FIG. 1) to generate the modulated gate control signal VGG for the integrated gate driver circuit GD1 still is the original value T1/T2, correspondingly, a high-level cycle of the angling control signal YV1C is T1, a low-level cycle of the angling control signal YV1C is T2, and an angled voltage of the modulated gate control signal VGG is V1. In another aspect, another duty ratio used by the angling control signal YV1C (for the convenience of description, hereinafter referred to as YV1C') at the time of modulating the gate control signal VGH to generate the modulated gate control signal VGG (for the convenience of description, hereinafter referred to as VGG') for the integrated gate driver circuit GD2 is adjusted to be T1'/T2', correspondingly, a high-level cycle of the angling control signal YV1C' is T1', a low-level cycle of the angling control YV1C' is T2', and an angled voltage of the modulated gate control signal VGG' is V2. Herein, the angling control signal YV1C and the angling control signal YV1C' have the same transmission path but are provided in a non-synchronous manner, T1+T2=T1'+T2', the angled voltage V1 and the angled voltage V2 are different from each other.

Moreover, the relative magnitude relationship between the duty ratios T1/T2 and T1'/T2' and the relative magnitude relationship between the angled voltages V1 and V2 are related to transmission path lengths of the modulated gate control signals VGG, VGG' transmitted to the respective integrated gate driver circuits GD1, GD2. In the illustrated embodiment, the transmission path length of the modulated gate control signal VGG transmitted to the integrated gate driver circuit GD1 is smaller than the transmission path length of the modulated gate control signal VGG' transmitted to the integrated gate driver circuit GD2, the duty ratio T1/T2 is larger than the duty ratio T1'/T2'. Correspondingly, the low-level cycle T2 of the angling control signal YV1C is smaller than the low-level cycle T2' of the angling control signal YV1C', and the angled voltage V1 is higher than the angled voltage V2.

It is further found from FIG. 5 that, the angled voltage is varied with the change of the duty ratio of the angling control signal, and more specifically, when the duty ratio of the angling control signal YV1C (YV1C') is changed from T1/T2 to T1'/T2', the angled voltage is changed from V1 to V2 correspondingly. Furthermore, the angled voltage in the illustrated embodiment is varied with the change of the low-level cycle of the angling control signal, and in particular, when the low-level cycle of the angling control signal YV1C (YV1C') is changed from T2 to T2', the angled voltage is changed from V1 to V2 correspondingly. Accordingly, by adjusting the duty ratio or low-level cycle of the angling control signal, it is easily to achieve the purpose that $V1-V2=\Delta V0$ to compensate the wire attenuation of the modulated gate control signals VGG, VGG' during being transmitted to the respective integrated gate driver circuits GD1, GD2. As a result, the gate control signals VGG1, VGG2 arrived at the respective integrated gate driver circuits GD1, GD2 have no voltage difference, i.e., $\Delta V=0$ as shown in FIG. 6.

Figure 7:
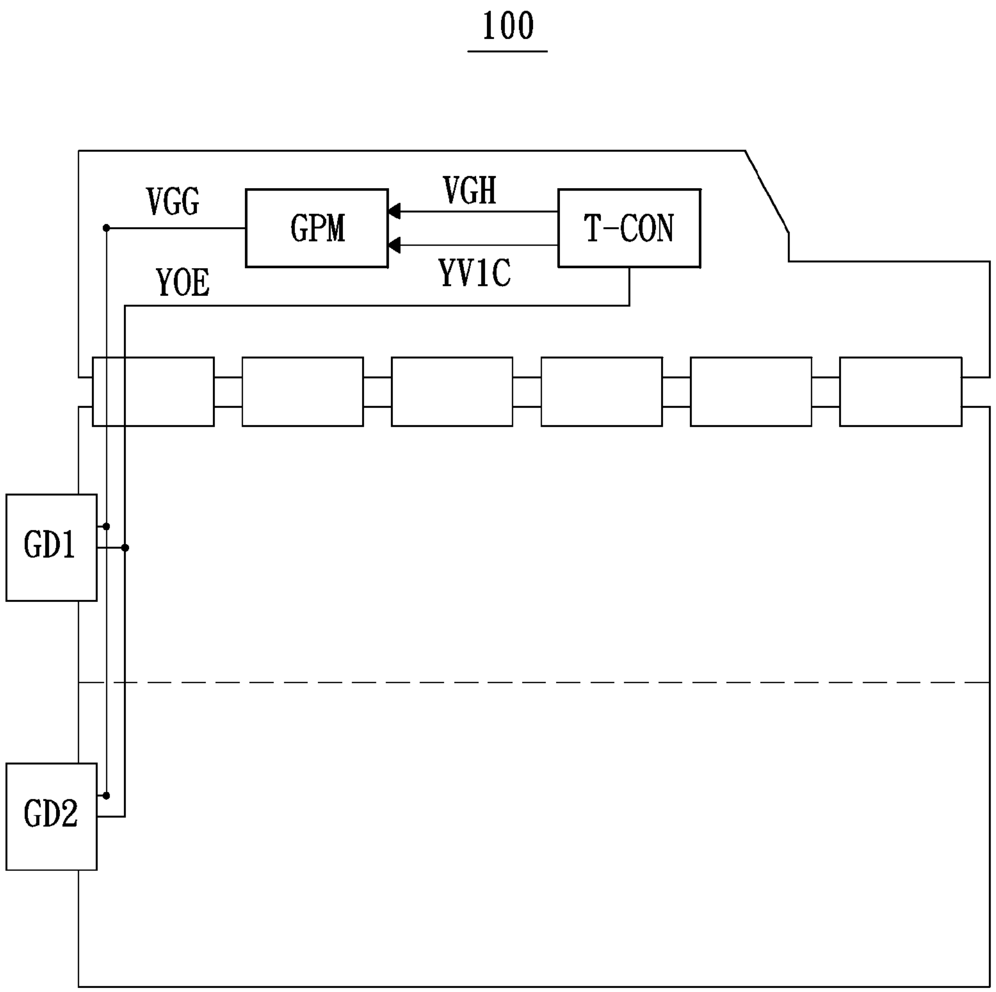
FIG. 7 shows a structural block diagram of a liquid crystal display, in accordance with an embodiment of the present invention.

In addition, the integrated gate driver circuits GD1, GD2 in accordance with the above-mentioned embodiment are not limited to be electrically coupled with each other in series, and can be electrically coupled with each other in parallel through WOA lines as illustrated in FIG. 7.

It is indicated that, the gate output control method in accordance with the embodiment of the present invention is not limited to be adapted to the liquid crystal display including two integrated gate driver circuits, and also adapted to a liquid crystal display including more (e.g., three or much more) integrated gate driver circuits, by suitably adjusting the duty ratio or low-level cycle of the angling control signal, the purpose of the modulated gate control signals arrived at the respective integrated gate driver circuits having no voltage difference would be easily achieved.

In summary, in the above-mentioned embodiments of the present invention, by adjusting the duty ratio or the low-level cycle of the angling control signal, different segments of the modulated gate control signals for controlling different integrated gate driver circuits would have different angled voltages and could compensate the wire attenuation of the modulated gate control signal during being transmitted to the integrated gate driver circuits. As a result, the segments of the modulated gate control signal arrived at the respective integrated gate driver circuits have no voltage difference from one another and thus the drawback of uneven vertical brightness associated with the prior art can be effectively overcome.

Additionally, the skilled person in the art can make some modifications with respect to the gate output control method in accordance with the above-mentioned embodiments, for example, changing the angling control signals YV1C, YV1C' to have different transmission paths, suitably setting the values of the duty ratios T1/T2, T1'/T2' according to practical requirements, and so on, as long as such modification(s) would not depart from the scope and spirit of the present invention.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A gate output control method, adapted to a liquid crystal display comprising a first integrated gate driver circuit and a second integrated gate driver circuit, the gate output control method comprising:

providing a gate control signal;

providing a first angling control wave-signal with a first high-level time interval and a first low-level time interval to angling modulate the gate control signal and generating a first modulated gate control signal for the first integrated gate driver circuit, wherein the first angling control wave-signal has a first duty ratio of the first high-level time interval/the first low-level time interval; and providing a second angling control wave-signal with a second high-level time interval and a second low-level time interval to angling module the gate control signal and generating a second modulated gate control signal for the second integrated gate driver circuit, wherein the second angling control wave-signal has a second duty ratio of the second high-level time interval/the second low-level time interval, and the second duty ratio is different from the first duty ratio;

wherein the first modulated gate control signal and the second modulated gate control signal sequentially control the first integrated gate driver circuit and the second integrated gate driver circuit, to sequentially control the gate outputs of the first integrated gate driver circuit and the second integrated gate driver circuit.

2. The gate output control method as claimed in claim 1, wherein when a transmission path length of the first modulated gate control signal transmitted to the first integrated gate driver circuit is shorter than another transmission path length of the second modulated gate control signal transmitted to the second integrated gate driver circuit.

3. The gate output control method as claimed in claim 1, wherein a sum of the first high-level time interval and the first low-level time interval is equal to a sum of the second high-level time interval and the second low-level time interval.

4. The gate output control method as claimed in claim 1, wherein when a transmission path length of the first modulated gate control signal transmitted to the first integrated gate driver circuit is shorter than another transmission path length of the second modulated gate control signal transmitted to the second integrated gate driver circuit, the first low-level time interval is smaller than the second low-level time interval, and the first high-level time interval is longer than the second high-level time interval.

5. The gate output control method as claimed in claim 1, wherein the first integrated gate driver circuit and the second integrated gate driver circuit are electrically coupled with each other in series.

6. The gate output control method as claimed in claim 1, wherein the first integrated gate driver circuit and the second integrated gate driver circuit are electrically coupled with each other in parallel.

7. A gate output control method, adapted to a liquid crystal display comprising a plurality of integrated gate driver circuits, the gate output control method comprising:

providing a gate control signal;

providing a plurality of angling control wave-signals in a non-synchronous manner to angling modulate the gate control signal and thereby generating a plurality of modulated gate control signals having different angled voltages, wherein each of the angling control wave-signals has a high-level time interval and a low-level time interval, and a corresponding duty ratio of the high-level time interval/the low-level time interval such that the plurality of the angling control wave-signals have a plurality of corresponding duty ratios, and the duty ratios are different with each other; and supplying the modulated gate control signals to the integrated gate driver circuits respectively, to respectively control the gate outputs of the integrated gate driver circuits.

8. The gate output control method as claimed in claim 7, wherein the angling control wave-signals have the same transmission path.

9. The gate output control method as claimed in claim 7, wherein the integrated gate driver circuits are electrically coupled with one another in series.

10. The gate output control method as claimed in claim 7, wherein the integrated gate driver circuits are electrically coupled with one another in parallel.

11. A gate output control method, adapted to a liquid crystal display comprising a plurality of integrated gate driver circuits, the gate output control method comprising:

providing a gate control signal and a plurality of angling control wave-signals for periodically discharging the gate control signal;

making the gate control signal having different discharging time lengths by the angling control wave-signals respectively to thereby generate modulated gate control signals, wherein each of the angling control wave-signals has a high-level time interval and a low-level time interval, and a corresponding duty ratio of the high-level time interval/the low-level time interval such that the plurality of the angling control wave-signals have a plurality of corresponding duty ratios, and the duty ratios are different with each other;

using a voltage level transition of a same gate output enable signal to define angled voltages of the modulated gate control signals and thereby the modulated gate control signals are with different angled voltages; and supplying the modulated gate control signals with different angled voltages through a wire-on-array line respectively to the integrated gate driver circuits, to control the gate outputs of the integrated gate driver circuits.

12. The gate output control method as claimed in claim 11, wherein a sum of the high-level time interval and the low-level time interval of each of the angling control wave-signals remain constant as the duty ratios of the angling control wave-signals vary.

* * * * *